United States Patent [19]

Ushida et al.

[11] 4,315,874
[45] Feb. 16, 1982

[54] PROCESS FOR THE PRODUCTION OF SPHERICAL CARRIER PARTICLES FOR OLEFIN POLYMERIZATION CATALYSTS

[75] Inventors: Yoshihisa Ushida, Ohtake; Yoshikatu Amimoto, Iwakuni; Akinori Toyota, Iwakuni; Norio Kashiwa, Iwakuni, all of Japan

[73] Assignee: Mitsui Petrochemical Industries Ltd., Tokyo, Japan

[21] Appl. No.: 137,641

[22] Filed: Apr. 7, 1980

[30] Foreign Application Priority Data

Apr. 11, 1979 [JP] Japan .................................. 54/43002

[51] Int. Cl.³ ............................................... B01J 2/00
[52] U.S. Cl. ............................................ 264/5; 264/9
[58] Field of Search ........................................ 264/5, 9

[56] References Cited

FOREIGN PATENT DOCUMENTS 1271411  4/1972  United Kingdom .
1433537  4/1976  United Kingdom .
1434543  5/1976  United Kingdom .
1452314  10/1976 United Kingdom .
1502886  3/1978  United Kingdom .
1505315  3/1978  United Kingdom .

Primary Examiner—James R. Hall
Attorney, Agent, or Firm—Sherman & Shalloway

[57] ABSTRACT

This invention provides a process for producing spherical carrier particles for olefin polymerization catalyst, which comprises
(i) forming a suspension of molten droplets of an adduct of a halogen-containing magnesium compound and an active hydrogen-containing organic compound in an organic liquid medium in the presence of at least one oil soluble surface-active agent as an auxiliary component, and
(ii) quenching the resulting suspension to solidify the adduct particles.

7 Claims, No Drawings

PROCESS FOR THE PRODUCTION OF SPHERICAL CARRIER PARTICLES FOR OLEFIN POLYMERIZATION CATALYSTS

This invention relates to an improved process for producing spherical catalyst carrier particles for olefin polymerization catalysts. These carrier particles can be produced from inexpensive, easily available halogen-containing magnesium compounds by an easy operation with industrial advantage, and are particularly useful for preparing catalysts which are suitable for the production of olefin polymers in spherical particles having a high bulk density, a narrow particle size distribution and good flowability.

In the present application, the term "polymerization" denotes both homopolymerization and copolymerization, and the term "polymer" denotes both homopolymers and copolymers.

Many suggestions have been made in the past about the use of a transition metal compound supported on a carrier in the polymerization of olefins with or without dienes or other comonomers in the presence of catalysts composed of a transition metal compound component and an organometallic compound component. The use of spherical carrier particles in the carrier-supported transition metal compound is known to be contributory to the production of olefin polymers in the form of spherical particles. If the amount of olefin polymer yielded per unit weight of the carrier-supported transition metal compound component is sufficiently high, it ill bring about a great advantage in industrial operations in that de-ashing of the olefin polymer can be omitted. Furthermore, if the use of the carrier-supported transition metal compound catalyst can lead to the formation of an olefin polymer having a high bulk density and a good particle size distribution, molding of the resulting polymer would become easy and even the customary granulation of the polymer could, in some cases, be omitted.

Attempts have been made to provide olefin polymerization catalyst carriers in the form of spherical particles. For example, Japanese Laid-Open Patent Publication No. 65999/74 (corresponding to British Pat. No. 1,434,543) suggests the use of particles obtained by spray-granulating a molten mass of hydrated magnesium halide or an alcohol solution of magnesium halide as a carrier for olefin polymerization catalysts. Olefin polymer particles produced in the presence of a catalyst having the carrier particles prepared by the suggested method do not show satisfactory resistance to disintegration and tend to be disintegrated into a fine powder or irregularly-shaped particles during operation or handling after the polymerization operation, for example during pumping or centrifugation. Furthermore, the carrier itself does not have sufficient resistance to disintegration, and makes it difficult to form satisfactory spherical polymer particles.

In order to overcome such difficulties, Japanese Laid-Open Patent Publication No. 38590/77 (corresponding to west German DOS No. 2,641,960) suggests the use of a magnesium halid hydrate prepared by a special method as a starting material for the carrier. This technique, however, has the disadvantage that the starting magnesium halide hydrate must be prepared by the special method which is complicated and difficult to carry out, and therefore the reproducibility of the quality of the resulting carrier is not good.

The present inventors made investigations in order to provide a carrier which is free from the defects and disadvantages of prior techniques of providing spherical catalyst carrier particles for olefin polymerization. These investigations have led to the discovery that spherical carrier particles for olefin polymerization catalysts having satisfactory resistance to disintegration can be prepared commercially from easily available halogen-containing magnesium compounds by an easy and inexpensive means and with good reproducibility of quality.

Specifically, it has been found that a carrier having a superior spherical shape and satisfactory resistance to disintegration can be easily produced with good reproducibility from a conventional halogen-containing magnesium compound readily available on the market by quenching a suspension of droplets in the molten state of an adduct of a halogen-containing magnesium compound and an active hydrogen-containing organic compound in an organic liquid medium and at least one surface-active agent as an auxiliary component, thereby to solidify the adduct particles.

It has also been found that a catalyst prepared by supporting a transition metal compound on the spherical carrier particles so obtained and combining it with an organometallic compound of a metal of Groups I to III of the Mendelejeff's periodic table exhibits high activity in the polymerization of olefins, and can afford with good reproducibility an olefin polymer in spherical shape which has a high bulk density, a narrow particle size distribution, good resistance to disintegration and good flowability.

It is an object of this invention to provide a process for producing spherical catalyst particles for olefin polymerization catalysts, which can achieve the aforesaid improvements.

The above and other objects and advantages of this invention will become more apparent from the following description.

The carrier in accordance with this invention is derived from an adduct composed of a halogen-containing magnesium compound and an active hydrogen-containing organic compound. The halogen-containing magnesium compound forming the above adduct may be a complex which further contains other metals such as aluminum, tin, silicon or germanium. The adduct may be synthesized by any method, and it may be a mixture of two or more adducts.

Examples of the halogen-containing magnesium compound include magnesium halides, preferably magnesium dihalides, or their complexes; products obtained by halogenating organic magnesium compounds, organic magnesium-aluminum complexes, the reaction products of these with organic silicon compounds such as siloxane, silanol or alkoxysilane compounds, or organic acid salts, alkoxides, aryloxides or acetylacetonates of magnesium, with halogenating agents, for example halogens such as chlorine, hydrogen halides such as hydrogen chloride, $PCl_3$, $POCl_3$, $BCl_3$, $SOCl_2$, $SiCl_4$, $AlCl_3$, aluminum alkyl monohalides, aluminum alkyl dihalides, alkoxy aluminum halides or benzoyl chloride; products obtained by mixing and milling the aforesaid halogenation products and the aforesaid magnesium compounds; the reaction products of magnesium, alcohol and halogenating agents such as hydrogen halides or halogen-containing silicon compounds; and decomposition products of Grignard reagents. Among these halogen-containing magnesium compounds preferred are magnesium dihalides and the complexes thereof, for example magnesium chloride, magnesium bromide, magnesium iodide, and the complexes of these.

The active hydrogen-containing organic compound forming the adduct includes, for example, alcohols, phenols, organic carboxylic acids, and amines. The alcohols are preferred. Specific examples of the active hydrogen-containing organic compound are alcohols having 1 to 18 carbon atoms such as methanol, ethanol, n-propanol, isopropanol, n-butanol, isobutanol, sec-butanol, tert-butanol, n-pentanol, n-hexanol, n-octanol, 2-ethylhexanol, n-decanol, n-dodecanol, n-hexadecyl alcohol, stearyl alcohol and oleyl alcohol; phenols having 6 to 15 carbon atoms such as phenol, cresol, xylenol, ethylphenol, isopropylphenol, p-tert-butylphenol, n-octylphenol, n-nonylphenol, cumyl phenol and naphthol; carboxylic acids having 1 to 18 carbon atoms such as formic acid, acetic acid, propionic acid, butyric acid, caproic acid, caprylic acid, lauric acid, stearic acid and olefic acid; and amines having 1 to 16 carbon atoms such as methylamine, ethylamine, diethylamine, n-propylamine, n-hexylamine, laurylamine, cyclohexylamine, aniline, benzylamine, and ethanolamine. These active hydrogen-containing compounds may be used in combination of two or more.

When the halogen-containing magnesium compound is a magnesium dihalide $MgX_2$ (X is halogen) which is a preferred species in this invention as described hereinabove, the resulting adduct can be expressed by the formula $MgX_2 \cdot Y_n$ in which Y is the active-hydrogen-containing compound and n is a number of from 1 to 10. As the hydrogen-containing compound in this case, an alcohol is especially preferred because it can give adducts which have a realtively low melting point and therefore can be easily formed into adduct droplets in the molten state suspended in an organic liquid medium (A), and which when a transition metal compound is supported on it, can easily afford a catalyst of high performance.

The adduct is suspended in the molten state in the organic liquid medium (A). Accordingly, the organic liquid medium (A) should not have such a high level of affinity for the adduct that a suspension of the adduct particles in the molten state cannot be formed. As the organic liquid medium (A), hydrocarbons such as hexane, heptane, octane, decane, kerosene, cyclohexane, benzene, toluene, xylene, cumene, cymene, diisopropylbenzene, tetralin, decalin and dimethylnaphthaline are especially suitable. Other liquids such as halogenated hydrocarbons and ethers can also be used. These organic media may be used singly or in combination with each other.

In preparing the suspension of the adduct in the molten state in the organic liquid medium (A), at least one surface-active agent (exclusive of siloxanes) as an auxiliary component is caused to be present together in the medium.

Oil-soluble surfactants are suitable in this invention, and those having an HLB of less than about 6 are preferred. The surfactants may be any of nonionic, anionic, cationic and amphoteric surfactants.

Specific examples of the surfactants include polyoxyalkylene glycols having a $C_2$–$C_3$ alkylene group such as polyoxypropylene glycol and polyoxyethylenepolyoxypropylene glycol; polyoxyalkylene $C_8$–$C_{18}$ alkyl ethers having a $C_2$–$C_3$ alkylene group such as polyoxyethylene stearyl ether, polyoxyethylene cetyl ether, polyoxyethylene myristyl ether, polyoxyethylene oleyl ether and polyoxyethylenepolyoxypropylene lauryl ether; polyoxyalkylene $C_{12}$–$C_{22}$ aryl ethers having a $C_2$–$C_3$ alkylene group such as polyoxyethylene nonyl phenol ether, polyoxyethylenepolyoxypropylene octyl phenol ether and polyoxyethylene styrenated phenol; polyoxyalkylene acyl esters having an acyl group derived from a $C_8$–$C_{24}$ carboxylic acid and a $C_2$–$C_3$ alkylene group, such as polyoxyethylene monolaurate, polyoxyethylene dilaurate, polyoxyethylene stearate, polyoxyethylene oleate, polyoxyethylene sorbitan monoleate, polyoxyethylene sorbitan monolaurate and polyoxyethylene castor oil; esters of $C_{12}$–$C_{18}$ fatty acids with $C_2$–$C_{12}$ polyhydric alcohols, such as ethylene glycol fatty acid esters, diethylene glycol fatty acid esters, propylene glycol fatty acid esters, glycerin fatty acid esters, sorbitan fatty acid esters and sucrose fatty acid esters; polyoxy ethylene alkylamides; polyoxyethylene alkylamines; fatty acid N-alkanolamides having a $C_2$–$C_3$ alkanol group; quaternary ammonium salts; betaine; polyether phosphate; and polyether sulfate.

More specific examples of the surfactants are sorbitan trioleate (HLB 1.8), sorbitan tristearate (HLB 2.1), propylene glycol monostearate (HLB 3.4), sorbitan sesquioleate (HLB 3.7), sorbitan monoleate (HLB 4.3), sorbitan distearate (HLB 4.4), propylene glycol monolaurate (HLB 4.5), sorbitan monostearate (HLB 4.7), diethylene glycol monostearate (HLB 4.7), diethylene glycol monolaurate (HLB 6.1), sorbitan monopalmitate (HLB 6.7), and sorbitan monolaurate (HLB 8.6). These surfactants may be used in combination of two or more.

The amount of the surfactant is that which is sufficient for the adduct of the halogen-containing magnesium compound and the active hydrogen-containing compound to be suspended in the molten state in the organic medium (A). For example, the suitable concentration of the surfactant in the organic liquid medium (A) is about 0.1 to about 30 g/liter, especially about 0.5 to about 20 g/liter. The concentration of the adduct in the organic liquid medium (A) is, for example, about 0.05 to about 2 moles/liter, preferably about 0.1 to about 1 mole/liter.

According to the process of this invention, molten droplets of the adduct composed of the halogen-containing magnesium compound and the active hydrogen-containing organic compound are suspended in the organic liquid medium (A) in the co-presence of surfactants of the types exemplified hereinabove as an auxiliary component to form a suspension of the adduct droplets in the molten state. The suspension can be formed, for example, by suspending the molten adduct droplets in the organic liquid medium (A) in the co-presence of at least one surfactant at a temperature at which the adduct melts or at a higher temperature by known suspending methods. Examples include a shaking method, a stirring method, a leaking method, an injection method, the Jurgen-Lohman method, an ultrasonic method, a colloid mill method, a high-pressure jetting method, or combinations of these.

By using these suspending methods, the suspension can be formed so that the adduct droplets in the suspension become spherical droplets having a particle diameter of about 0.1 to about 200 microns, preferably about 1 to about 100 microns.

By quenching the resulting suspension of the molten adduct droplets, the adduct droplets are solidified and the desired spherical catalyst carrier can be formed. Any desired method of quenching can be employed unless the suspended droplets coalesce with each other or deform to substantially lose the desired spherical shape. In one preferred embodiment, the suspension formed is rapidly contacted with an organic liquid medium (B) having a temperature low enough to solidify the molten adduct droplets. In the practice of this embodiment, the suspension can be introduced into the organic liquid medium (B) preferably with stirring. Or conversely, the medium (B) may be introduced into the suspension. The organic liquid medium (B) need not be, but may be, the same as the organic liquid medium (A). It may be properly selected from the compounds exemplified hereinabove as the organic liquid medium (A).

In the quenching step, it is preferred to maintain the temperature of the organic liquid medium (B) at a point at least above 10° C. lower than the melting temperature of the adduct as suspended droplets. If desired, the aforesaid auxiliary component may also be incorporated in the medium (B).

In another embodiment of quenching, a liquefied gas held at a low temperature such as liquefied carbon dioxide gas or liquefied propane may be blown into the suspension of the adduct droplets and is gasified in the suspension to quench the suspension system and solidify the adduct particles.

The solidified particles of the adduct may be separated and recovered by any known solid-liquid separating means such as filtration or centrifugal separation. The resulting carrier for olefin polymerization catalysts is hard and exhibits satisfactory resistance to disintegration in the subsequent operations and handling. It is in the form of good spherical particles having a narrow distribution of particle size. A transition metal compound catalyst component for olefin polymerization obtained by supporting a transition metal compound on the resulting carrier by any means which does not substantially involve pulverization has the advantage of being hard and resistant to disintegration. Of course, the resulting spherical carrier particles may be classified to obtain a narrower size distribution before they are used in supporting the transition metal compound.

Various methods can be employed in supporting the transition metal compound on the carrier obtained by the process of this invention. They include, for example, a method which comprises reacting the carrier directly with the transition metal compound as in Japanese Patent Publication No. 34092/71 (corresponding to British Patent 1,271,411); a method which comprises reacting the carrier with an organometallic compound of a metal of Groups I to III of the periodic table and then reacting the product with the transition metal compound as in Japanese Patent Publication No. 32270/75 (corresponding to British Patent No. 1,433,537) or Japanese Laid-Open Patent Publication No. 21093/78 (corresponding to West German DOS No. 2735672); a method which comprises reacting the carrier with a halogen compound or organic compound of silicon or tin and the transition metal compound consecutively or simultaneously as in Japanese Laid-Open Publication No. 72383/74 and 88983/74 (the two Publications correspond to British Patent No. 1,452,314); a method which comprises reacting the carrier with an organic acid ester and an organometallic compound of a metal of Groups I to III of the periodic table, and then reacting the product with the transition metal compound as in Japanese Laid-Open Patent Publication No. 28189/76 (corresponding to British Patent No. 1,502,886); a method which comprises reacting the carrier with an organic acid ester and a halogen compound or organic compound of silicon or tin, and then reacting the product with the transition metal compound as in Japanese Laid-Open Patent Publication No. 92885/76 (corresponding to British Patent No. 1,505,315); a method which comprises reacting the transaction metal catalyst component obtained by any of the above-cited methods further with an organometallic compound of a metal of Groups I to III and the transition metal compound, as shown in Japanese Laid-Open Patent Publication No. 127185/76; and a method which comprises reacting the transition metal compound obtained in each of the aforesaid methods with an electron donor and the transition metal compound as in Japanese Laid-Open Patent Publication No. 30888/77.

The transition metal compound to be supported on the catalyst carrier obtained by the process of this invention may, for example, be a compound of titanium, vanadium, chromium, etc. The titanium compounds are preferred.

The supporting reaction may be performed by suspending the carrier, with or without the pre-treatment exemplified, in the transition metal compound which is maintained in the liquid phase under the supporting reaction conditions, or in a solution of the transition metal compound in an inert organic solvent. The supporting reaction can be carried out at a temperature of about 0° C. to about 200° C., preferably about 30° to about 150° C. Preferably, the supporting reaction is carried out in the presence of an excess of the transition metal compound, and for example, about 0.1 to about 100 moles, preferably about 1 to about 50 moles, of the transition metal compound is present per gram-atom of magnesium in the carrier. The supporting reaction may be performed in two steps or more. Preferred transition metal compounds are those which are liquid under the supporting reaction conditions, or are soluble in a solvent that may be used in the reaction. Specific examples are titanium compounds of the formula $Ti(OR)_n X_{4-n}$ in which R represents a hydrocarbon group, X represents a halogen atom, and n is a number represented by $0 \leq n \leq 4$; and vanadium compounds of the formula $VX_4$ or $VO(OR)_m X_{3-m}$ in which R and X are as defined, and m is a number represented by $0 \leq m \leq 3$. Examples of the group R are alkyl groups having 2 to 18 carbon atoms, cycloalkyl groups having 5 to 8 carbon atoms, an allyl group, and aryl groups having 6 to 15 carbon atoms. Examples of X are chlorine, bromine, and iodine. The titanium compounds are preferred, and titanium tetrahalides are especially preferred.

Pre-treatment of the carrier with an electron donor, an organometallic compound of a metal of Groups I to III of the periodic table, a halogen compound or organic compound of silicon or tin, etc. prior to the supporting of the transition metal compound is described in detail, for example, in the patent documents cited hereinabove. For example, the pretreatment may be carried out at about 0° to about 150° C. while suspending the carrier in an inert solvent.

The catalyst component obtained by supporting the transition metal compound on the carrier obtained by the process of this invention contains about 3 to about 120 mg, preferably about 5 to about 60 mg, of transition metal per gram of catalyst component. The atomic ratio of the halogen to the transition metal is at least about 4, preferably at least 8, more preferably from about 8 to about 50. The aforesaid catalyst component contains magnesium, halogen and transition metal as essential ingredients, and may optionally contain an electron donor such as an organic acid ester.

The supported transition metal catalyst component so obtained, in combination with an organometallic compound of a metal of Groups I to III of the Mendeleejeff's periodic table, can be used in the polymerization or copolymerization of olefins with or without dienes and other comonomers. Organoaluminum compounds are preferred as the organometallic compounds. Especially preferred among them are trialkyl aluminums, dialkyl aluminum halides, alkyl aluminum sesquihalides, alkyl aluminum halides, and mixtures of these.

Suitable olefins used in the aforesaid polymerization are $C_2$-$C_{10}$ olefins such as ethylene, propylene, 1-butene, 4-methyl-1-pentene and 1-octene. They may be subjected not only to homopolymerization but also to random copolymerization and block copolymerization. In copolymerization, polyunsaturated compounds such as conjugated or non-conjugated dienes may be selected as the comonomers. For example, in the copolymerization of propylene, there may be employed a method which comprises polymerizing propylene until the amount of propylene homopolymer is about 60 to about 90% by weight based on the entire composition, and subsequently, polymerizing a propylene-ethylene mixture or ethylene. Alternatively, a mixture of propylene and ethylene may be polymerized in order to obtain a copolymer containing ethylene in an amount of not more than about 10 mole%.

The polymerization may be carried out either in the liquid phase or in the vapor phase. In the liquid-phase polymerization, an inert solvent such as hexane, heptane or kerosene may be used as a reaction medium, but the olefin itself may also be used as the reaction medium. It is preferred that in the liquid phase polymerization, the amount of the supported transition metal compound component be about 0.001 to about 1 millimole calculated as transition metal atom per liter of the liquid phase, and the amount of the organometallic compound be about 1 to about 1000 moles, preferably about 5 to about 500 moles, calculated as metal atom per mole of transition metal. When the vapor-phase polymerization is carried out, a fluidized layer, a stirred fluidized layer, etc. may be employed, and the supported transition metal compound is fed into the polymerization reactor with or without dilution with a solid such as polyethylene, polypropylene, glass beads or silica, hexane, olefins, etc. while the organometallic compound is fed into the polymerization vessel with or without dilution with hexane, olefins, etc. In some cases, hydrogen, etc. may be fed in the form of gas into the polymerization vessel. The proportions of the catalyst components are the same as in the case of the liquid-phase polymerization.

The olefin polymerizing temperature is generally about 20° to about 200° C., preferably about 20° C. to a point below the melting point of the resulting polyolefin, especially preferably about 40° to about 120° C. The polymerization can be performed at atmospheric pressure to about 100 kg/cm².G, preferably at elevated pressures of about 2 to about 50 kg/cm².G.

In the polymerization of alpha-olefins, the molecular weight of the polymer can be adjusted to some extent by varying the polymerization conditions such as the polymerization temperature or the mole ratio of the catalyst ingredients. It can be effectively performed by adding hydrogen to the polymerization system. In the polymerization of alpha-olefins having at least 3 carbon atoms, there may be used an electron donor such as alcohols, ethers, esters, amines, acid anhydrides, ketones, carboxylic acids, amides, phosphorus compounds and polysiloxanes in order, for example, to control stereospecificity. The electron donor may be used in the form of an adduct with the organometallic compound or a Lewis acid such as $AlX_3$.

When, for example, propylene is polymerized using the supported transition metal catalyst component on the carrier obtained by the process of this invention, the amount of the transition metal is extremely small for the amount of polypropylene formed, and the polypropylene obtained is in the form of spherical particles having a narrow particle size distribution and a high bulk density. Accordingly, this offers the advantage that the after-treatment of the polymer subsequent to the polymerization is very much simplified, or in many cases, is not required at all. In polymerization in the absence of a solvent, great improvements are obtained in problems associated with the polymerization process, such as the uniformity of the fluidized condition, process restrictions by the formation of a fine powdery polymer, or the in-process transportation of the polymer powder, and a polymer which can directly be a final product can be obtained by the solventless polymerization.

The following examples illustrate the present invention more specifically.

EXAMPLE 1

[I] Synthesis of spherical $MgCl_2.nEtOH$

A 2-liter high-speed stirrer (a product of Tokushu Kika Kogyo K.K.), after full purging with nitrogen gas, was charged with 700 ml of purified kerosene, 10 g of commercially available $MgCl_2$, 24.2 g of ethanol and 3 g of Emasol 320 (a trademark for surfactants a product of Kao-Atlas Co., Ltd.; sorbitan distearate). The temperature was raised with stirring, and they were stirred at 120° C. for 30 minutes at 8,000 rpm. With high-speed stirring, the mixture was transferred by means of a Teflon tube having an inside diameter of 5 mm to a 2-liter glass flask (equipped with a stirrer) charged previously with 1 liter of purified kerosene cooled to −10° C. The resulting solid was collected by filtration, and washed thoroughly with hexane to form a carrier. Microscopic observation showed that the solid particles were completely spherical and had a particle diameter of 10 to 40 microns.

[II] Preparation of a Ti-containing catalyst component

A 300 ml glass flask was charged with 10 g of the solid obtained in [I] above (containing 30.7 millimoles of $MgCl_2$) and 100 ml of purified kerosene, and then 21.1 ml of triethyl aluminum was added dropwise at 5° C. with stirring. The mixture was stirred at 25° C. for 1 hour, and then at 80° C. for 3 hours. The solid portion was collected by filtration, thoroughly washed with hexane, and dried. The resulting solid was suspended in 100 ml of purified kerosene and dry air was blown into the suspension for 2 hours with stirring. The solid portion was collected by filtration, and washed fully with hexane. The resulting solid was suspended in 100 ml of purified kerosene, and 1.9 ml of ethyl benzoate was added. The mixture was stirred at 25° C. for 1 hour and then at 80° C. for 2 hours. The solid portion was collected by filtration, washed thoroughly with hexane, and dried. The solid was transferred to a 200 ml glass flask, and 100 ml of $TiCl_4$ was added. The mixture was stirred at 90° C. for 2 hours. The supernatant liquid was removed by decantation, and further 100 ml of TiCl$_4$ was added, followed by stirring at 90° C. for 2 hours. The solid portion was collected by hot filtration, and thoroughly washed with hot kerosene and hexane to afford a Ti-containing catalyst component which contained 3.8% by weight of Ti, 61.0% by weight of Cl, 18.0% by weight of Mg and 10.1% by weight of ethyl benzoate as atoms and had a specific surface area of 280 m$^2$/g and an average particle diameter of 33 microns.

[III] Polymerization

A 2-liter autoclave was charged with 0.75 liter of hexane, and in an atmosphere of propylene, 3.75 millimoles of triethyl aluminum, 1.25 millimoles of methyl p-toluate and 0.0225 mg calculated as Ti atom of the Ti-containing catalyst component obtained in [II] above were introduced into the autoclave. Then, 400 Nml of H$_2$ was added, and the polymerization system was heated to 60° C. The total pressure was raised to 7.0 kg/cm$^2$.G with propylene. While maintaining the pressure of propylene, propylene was polymerized for 4 hours. After the polymerization, the slurry containing the polymer was filtered to afford 193 g of a white powdery polymer. The polymer had a boiling n-heptane extraction residue of 96.4%, an apparent density of 0.41 g/ml and a melt flow index (MI) of 4.2. The polymer had an average particle diameter of 740 microns and a particle diameter distribution of 99% by weight in the range of 0.1 to 1.0 mm, and was spherical in shape. Concentrating the solvent layer gave 4.8 g of a solvent-soluble polymer. Accordingly, the average specific polymerization activity of the Ti-containing catalyst component was 8,800 g-PP/mmol-Ti.

EXAMPLES 2 TO 6

Example 1 was repeated except that in the synthesis of spherical MgCl$_2$.nEtOH in Example 1, each of the compounds shown in Table 1 was used is instead of Emasol 320. The results are shown in Table 1.

TABLE 1

| | Synthesis of spherical MgCl$_2$ . nEtOH | | | Ti-containing catalyst | | | Average particle diameter (microns) |
|---|---|---|---|---|---|---|---|
| Example | Surfactant (g) | HLB | Particle diameter (microns) | Ti wt. % | Cl wt. % | EB wt. % | |
| 2 | Span 60 (sorbitan monostearate) (4.0) | 4.7 | 10–100 | 3.4 | 61.0 | 10.3 | 43 |
| 3 | Span 65 (sorbitan tristearate) (4.0) | 2.1 | 10–90 | 3.7 | 60.0 | 9.8 | 40 |
| 4 | Span 80 (sorbitan monoleate) (4.0) | 4.3 | 5–180 | 4.2 | 58.0 | 11.7 | 36 |
| 5 | Emasol 83 (sorbitan sesquioleate) (4.0) | 3.7 | 10–100 | 4.0 | 59.0 | 10.8 | 38 |
| 6 | Span 85 (sorbitan trioleate) (4.0) | 1.8 | 5–100 | 3.2 | 61.0 | 9.5 | 30 |

| | Results of polymerization | | | | | | |
|---|---|---|---|---|---|---|---|
| Example | White powdery polymer (g) | n-Heptane extraction residue (%) | Apparent density (g/ml) | MI | Average particle diameter (microns) | Polymer with a particle diameter of 0.1–1.0 mm (wt. %) | Solvent-soluble polymer (g) | Specific polymerization activity (g-PP/mmol-Ti) |
| 2 | 184 | 96.0 | 0.39 | 3.7 | 810 | 96 | 4.3 | 8,400 |
| 3 | 190 | 95.9 | 0.41 | 5.1 | 790 | 97 | 4.7 | 8,700 |
| 4 | 169 | 96.2 | 0.38 | 4.0 | 750 | 92 | 5.2 | 7,700 |
| 5 | 187 | 96.3 | 0.41 | 3.3 | 800 | 96 | 5.3 | 8,500 |
| 6 | 203 | 95.8 | 0.40 | 3.0 | 670 | 97 | 5.0 | 9,200 |

COMPARATIVE EXAMPLE 1

The procedure set forth in [I] of Example 1 was repeated except that Emasol 320 was not used. A spherical carrier was scarcely obtained.

A Ti-containing catalyst component was prepared in the same way as in [II] of Example 1 using the resulting carrier. The catalyst component contained 3.0% by weight of Ti, 62.0% by weight of Cl and 10.5% by weight of ethyl benzoate as atoms.

Propylene was polymerized using the resulting Ti-containing catalyst component in the same way as in [III] of Example 1. There was obtained 200 g of a white powdery polymer. It had a boiling n-heptane extraction residue of 95.7% and a melt flow index of 3.0, but its apparent density was as low as 0.33 g/mole. The particle size distribution of the polymer was broad, and particles having a particle diameter of 0.1 to 1.0 mm accounted for 68% of the total weight of the polymer.

Concentrating the solvent layer afforded 5.8 g of a solvent-soluble polymer.

EXAMPLES 7 TO 12

The procedure set forth in Example 1 was carried out in the same way as in Example 1 except that in the synthesis of spherical MgCl$_2$.nEtOH in Example 1, the amount of Emasol 320 was changed as shown in Table 2. The results are shown in Table 2.

TABLE 2

| Synthesis of spherical MgCl$_2$ . nEtOH | | Ti-containing catalyst component | | | Average particle diameter |
|---|---|---|---|---|---|
| Amount of | Particle size | Ti | Cl | EB | |

TABLE 2-continued

| Example | Emasol 320 | (microns) | (wt. %) | (wt. %) | (wt. %) | (microns) |
|---|---|---|---|---|---|---|
| 7 | 8 | 5–80 | 4.2 | 59.0 | 9.8 | 38 |
| 8 | 6 | 10–80 | 4.2 | 60.0 | 10.3 | 36 |
| 9 | 5 | 10–70 | 4.0 | 61.0 | 11.0 | 33 |
| 10 | 4 | 10–60 | 3.6 | 61.0 | 10.0 | 35 |
| 11 | 2 | 10–70 | 3.2 | 60.0 | 10.5 | 35 |
| 12 | 1 | 10–90 | 3.2 | 62.0 | 9.4 | 41 |

Results of polymerization

| Example | White powdery polymer (g) | n-Heptane extraction residue (%) | Apparent density (g/ml) | M.I. | Average particle diameter (microns) | Polymer with a particle diameter of 0.1–1.0 mm (wt. %) | Solvent-soluble polymer (g) | Specific polymerization activity (g-PP/mmol-Ti) |
|---|---|---|---|---|---|---|---|---|
| 7 | 170 | 95.7 | 0.39 | 4.8 | 800 | 96 | 5.1 | 7,800 |
| 8 | 159 | 96.5 | 0.40 | 3.0 | 760 | 98 | 5.4 | 7,300 |
| 9 | 223 | 95.0 | 0.41 | 2.9 | 800 | 98 | 6.0 | 10,200 |
| 10 | 210 | 95.7 | 0.40 | 3.6 | 810 | 99 | 4.7 | 9,500 |
| 11 | 198 | 96.3 | 0.40 | 4.0 | 730 | 99 | 4.6 | 9,000 |
| 12 | 211 | 95.8 | 0.38 | 5.1 | 830 | 93 | 5.3 | 9,600 |

EXAMPLE 13

[I] Synthesis of spherical $MgCl_2.nEtOH$

A 3-liter autoclave, after full purging with nitrogen gas, was charged with 1.5 liters of purified kerosene, 75 g of commercially available $MgCl_2$, 109 g of ethanol and 10 g of Emasol 320, and they were heated with stirring. The mixture was stirred at 125° C. for 20 minutes at a stirring speed of 600 rpm. The pressure of the inside of the autoclave was adjusted to 10 kg/cm$^2$.G with $N_2$, and a cock attached to a stainless steel tube having an inside diameter of 3 mm kept at 125° C. and connected directly to the autoclave was opened to transfer the mixture in the autoclave to a 5-liter glass flask equipped with a stirrer and containing 3 liters of purified kerosene cooled at −15° C. The amount of the mixture thus transferred was 1 liter, and the time required for the transfer was about 20 seconds. The resulting solid was collected by filtration, and washed thoroughly with hexane to obtain a carrier. Microscopic observation showed that the resulting solid was in the form of completely spherical particles having a particle diameter of 5 to 30 microns.

[II] Preparation of a Ti-containing catalyst component

A 300 ml glass flask was charged with 8.1 g of the solid obtained in [I] above (containing 34.7 millimoles of $MgCl_2$) and 100 ml of purified kerosene. With stirring at 0° C., 1.1 ml of benzoyl chloride was added, and then 19.8 ml of $TiCl_4$ was slowly added dropwise at 0° C. After the addition, the temperature was raised to 20° C. over the course of 20 minutes. At 20° C., 100 ml of $TiCl_4$ was again added, and contacted at 40° C. for 4 hours. The solid portion was collected by filtration. The solid was transferred to a 300 ml glass flask, and 200 ml of $TiCl_4$ was further added. They were contacted with each other with stirring at 90° C. for 2 hours. The solid portion was collected by hot filtration, washed with hot kerosene and hexane, and dried.

The resulting Ti-containing catalyst component contained 4.3% by weight of Ti, 58.0% by weight of Cl, 20.0% by weight of Mg and 9.1% by weight of ethyl benzoate as atoms. The catalyst component had a specific surface area of 186 m$^2$/g and an average particle diameter of 10 microns.

[III] Polymerization

Propylene was polymerized in the same way as in Example 1 using the Ti-containing catalyst component thus obtained. There was obtained 162 g of a white powdery polymer having a boiling n-heptane extraction residue of 9.47%, an apparent density of 0.43 g/ml and a melt flow index of 3.2. The polymer had an average particle diameter of 280 microns and particles having a particle diameter of 0.1 to 1.0 mm accounted for 99% by weight of the total weight of the polymer. The polymer was in the form of spherical particles. Concentrating the solvent layer afforded 5.6 g of a solvent-soluble polymer. Accordingly, the average specific polymerization activity of the Ti-containing catalyst component was 7,400 g-PP/mmol-Ti.

EXAMPLE 14

[I] Synthesis of spherical $MgCl_2.nEtOH$

A catalyst carrier was synthesized in the same way as in Example 13 except that in the synthesis of spherical $MgCl_2.nEtOH$ in Example 13, 112.5 g of $MgCl_2$, 163 g of ethanol and 5 g of Emasol 320 were used. The resulting solid was in the form of completely spherical particles having a particle diameter of 5 to 40 microns.

[II] Preparation of a Ti-containing catalyst component

A 300 ml glass flask was charged with 150 ml of $TiCl_4$, and 7.5 g of the solid obtained in [I] above suspended in 15 ml of purified kerosene was added at 20° C. with stirring. Then, 1.83 ml of ethyl benzoate was added, and the mixture was heated to 100° C. It was stirred at 100° C. for 2 hours, and then the stirring was stopped. The supernatant liquid was removed by decantation, and 150 ml of $TiCl_4$ was added. The mixture was stirred at 110° C. for 2 hours. The solid portion was collected by hot filtration, and washed fully with hot kerosene and hexane to afford a Ti-containing catalyst component containing 4.4% by weight of Ti, 59.0% by weight of Cl, 19.0% by weight of Mg and 13.0% by weight of ethyl benzoate as atoms, and having a specific surface area of 207 m$^2$/g and an average particle diameter of 13 microns.

[III] Polymerization

Propylene was polymerized in the same way as in Example 1 using the resulting Ti-containing catalyst component. There was obtained 295 g of a white powdery polymer which had a boiling n-heptane extraction residue of 96.1%, an apparent density of 0.45 g/ml and a melt flow index of 3.5. The polymer had an average particle diameter of 340 microns and a particle size distribution of 99% by weight in the range of 0.1 to 1.0 mm, and was in the form of spherical particles. Concentrating the solvent layer afforded 4.2 g of a solvent-soluble polymer. Accordingly, the average specific polymerization activity of the Ti-containing catalyst component was 13,300 g-PP/mmole-Ti.

EXAMPLE 15

[I] Synthesis of spherical $MgCl_2.nEtOH$

A catalyst carrier was prepared in the same way as in Example 13 except that in the synthesis of spherical $MgCl_2.nEtOH$ in Example 13, the pressure of the inside of the autoclave was adjusted to 3 kg/cm$^2$.G with $N_2$, and a stainless tube having an inside diameter of 2 mm was used in transferring the mixture to the glass flask. The time required for the transfer was about 60 seconds. The solid obtained was in the form of completely spherical particles having particle diameter of 5 to 18 microns.

[II] Preparation of a Ti-containing catalyst component

A 300 ml glass flask was charged with 15 g of the solid obtained in [I] above and 150 ml of purified kerosene. With stirring, 106 ml of TiCl$_4$ was added dropwise at 20° C. and then, the mixture was heated to 80° C. The mixture was stirred at 80° C. for 1 hour, and then the stirring was stopped. The supernatant liquid was removed by decantation. Furthermore, 200 ml of TiCl$_4$ was added, and the mixture was stirred at 110° C. for 2 hours. The solid portion was collected by hot filtration, and washed thoroughly with hot kerosene and hexane to afford a Ti-containing catalyst component. The resulting catalyst component contained 8.2% by weight of Ti, 65% by weight of Cl and 17% by weight of Mg as atoms, and had an average particle diameter of 7 microns.

[III] Polymerization

A 3-liter autoclave was charged with 1 liter of hexane, and under an atmosphere of $N_2$, 1.0 mmole of triisobutyl aluminum and 0.01 mg, calculated as Ti atom, of the Ti-containing solid catalyst component obtained in [II] above were fed into the autoclave.

The system was heated to 85° C., and the total pressure was raised to 8.0 kg/cm$^2$.G with ethylene. Ethylene was polymerized for 2 hours while maintaining the pressure of ethylene. After the polymerization, the slurry containing the resulting polymer was filtered to afford 543 g of a white powdery polymer having an apparent density of 0.35 g/ml. The polymer was in the form of spherical particles having an average particle diameter of 390 microns and a particle size distribution of 100% in the range of 0.1 to 1.0 mm. Accordingly, the average specific polymerization activity of the Ti-containing catalyst component was 54,300 g-PE/mmole-Ti.

What we claim is:

1. A process for producing spherical carrier particles for olefin polymerization catalyst, which comprises
   (i) forming a suspension of molten droplets of an adduct of a halogen-containing magnesium compound and an active hydrogen-containing organic compound selected from the group consisting of alcohols having 1 to 18 carbon atoms, phenols having 6 to 15 carbon atoms, organic carboxylic acids having 1 to 18 carbon atoms and amines having 1 to 16 carbon atoms, in an organic liquid medium selected from the group consisting of hydrocarbons, halogenated hydrocarbons, and ethers in the presence of at least one oil soluble surface-active agent as an auxiliary component, and
   (ii) quenching the resulting suspension to solidify the adduct droplets.

2. The process of claim 1 wherein said quenching is performed by contacting the suspension with an organic liquid medium having a temperature low enough to solidify the molten adduct droplets.

3. The process of claim 2 wherein the temperature of said organic liquid medium to be contacted with the suspension is at least about 10° C. lower than the melting point of said adduct droplets.

4. The process of claim 1 wherein said halogen-containing magnesium compound is selected from the group consisting of magnesium dihalides and complexes thereof.

5. The process of claim 1 wherein said oil soluble surface-active agents are nonionic surface-active agents.

6. The process of claim 5 wherein said nonionic surface-active agents have an HLB of less than about 6.

7. The process of claim 1 wherein the amount of said surface-active agents used is about 0.5 to about 20 g per liter of said organic liquid medium.

* * * * *